United States Patent [19]
Kontz et al.

[11] 3,796,530
[45] Mar. 12, 1974

[54] PARISON ENGAGING, SEVERING AND STRIPPING MECHANISM

[75] Inventors: Robert F. Kontz, Toledo, Ohio; Richard A. Morrette, Temperance, Mich.

[73] Assignee: Owens-Illinois, Inc., Toledo, Ohio

[22] Filed: Jan. 26, 1972

[21] Appl. No.: 220,857

[52] U.S. Cl........ 425/305 B, 83/914, 425/DIG. 212, 425/302 B
[51] Int. Cl............................................ B29d 23/03
[58] Field of Search ............ 425/302 B, 305, 305 B, 425/DIG. 212, DIG. 206; 83/914, 380; 264/99, 98

[56] References Cited
UNITED STATES PATENTS
3,579,621    5/1971    Mehnert.................... 425/305 B
3,382,532    5/1968    Schweiger.................. 425/305 B
3,457,590    7/1969    Dittmann................... 425/305 B FOREIGN PATENTS OR APPLICATIONS
12,922    9/1962    Japan......................... 425/305 B

*Primary Examiner*—Richard B. Lazarus
*Attorney, Agent, or Firm*—Philip M. Rice; E. J. Holler

[57] ABSTRACT

The present invention provides an apparatus and method for engaging a freely extruded tubular parison prior to closure of a separable blow mold to position the parison for a subsequent blow molding operation, to sever the parison prior to closure of the blow mold and to insure proper stripping of the blown parison from the blow mold as the mold is opened following blowing.

4 Claims, 7 Drawing Figures

PARISON ENGAGING, SEVERING AND STRIPPING MECHANISM

RELATED APPLICATIONS

The mechanism of the present invention is particularly adapted for and intended for use with the method and apparatus disclosed in the pending patent application of Donald H. Criss and Irwin P. Pollitt, Serial No. 835,091, filed in the United States Patent Office on Jun 20, 1969 now U.S. Pat. No. 3,652,751.

BRIEF DESCRIPTION OF THE INVENTION

Probably the most common type of blow molding machine is the so-called "free extrusion" type machine, wherein, a free dependent tube of plasticized, thermoplastic material is issued from a downwardly directed orifice. As the tube issues from the orifice, a sectional blow mold is closed on the tube, the mold moves downwardly with the tube as successive portions of the tube are extruded, and the mold-enclosed portion of the tube or the "parison" is inflated interiorly of the closed blow mold. The blow mold then is opened and the blowed article is removed therefrom.

In the past, some difficulties have been encountered in properly positioning the extruded tubular parison interiorly of the blow mold prior to closure of the blow mold thereon. Any axial misalignment between the tube and the blow mold cavity results in the generation of excessive flash, the formation of a blow article of unequal peripheral wall thickness, and difficulty in properly aligning the blowing mechanism with the parison.

Further difficulties have been encountered in removing the blown article from the blow mold cavity upon opening of the blow mold sections. If the blown article releases from one section of the blow mold, but hangs up in the other section, then succeeding portions of the tube are not properly axially aligned with the blow mold subsequently closed thereon, and all of the above difficulties are encountered.

Following the complete blow molding and stripping operation, a severing knife usually is employed to cut the blown article from the remainder of the extruded parison. Such a knife generally requires mounting on the mold, and a separate knife-actuating mechanism must be provided for operating in timed sequence with the remainder of the molding apparatus. These severing systems are complicated and expensive, and precautions must be taken to prevent radial displacement of the extruded parison when utilizing such a severing system.

All of the above difficulties are encountered to an exaggerated degree during extremely high speed blow molding operations, such as are carried out by utilization of the apparatus and method of the above identified Criss, et al application, assigned to the assignee of the present invention.

BRIEF DESCRIPTION OF THE PRESENT INVENTION

The present invention now provides an extremely simple, inexpensive mechanism for centering the tubular parison with respect to the mold cavity defined by a pair of separable molds, for severing the tubular parison prior to the blowing operation rather than after the blowing operation, and for accurately and quickly stripping the blown article from the mold cavity and retaining the article in accurate alignment with subsequently extruded parison portions. Further, all of this is carried out without any extraneous actuating mechanism, without the necessity of sensor controls, and as a consequence of the primary machine function of opening and closing the blow molds themselves.

Thus, the mechanism of the present invention is particularly adapted for utilization with extremely high speed blow molding machines such as that disclosed in the above identified Criss, et al application. Of course, the mechanism of the present invention can be utilized with other types of blow mold machines. For example, the above identified Criss, et al apparatus and method utilizes swingable, arcuately closable blow mold sections and the device of the present invention is well adapted to this type of blow mold. However, it is equally adaptable for utilization with linearly closable blow molds actuated by separate blow mold closing cylinders.

In essence, the mechanism of the present invention comprises a pair of parison-engaging elements mounted at one axial extremity of each blow mold section. Preferably, and as illustrated, this is the lower or leading end of the blow mold sections, but the parison-engaging elements can also be located at the trailing end of the blow mold sections. The parison-engaging elements are slidably mounted on each of the blow mold sections for movement in a plane essentially radial to the parison, and the parison-engaging elements project ahead of the blow mold sections, so that the elements engage the parison prior to complete closure of the blow mold sections on the parison. Thus, the elements engage the lower end of the parison to be blown and retain this lower end in a centralized, axially aligned position relative to the blow molds during the remainder of the blow mold closing movement.

Sandwiched between the parison-engaging elements on one of the blow mold sections is fixed a parison-severing knife. This knife also is positioned in advance of the blow mold section to which it is attached, but the knife slightly trails the adjacent parison-engaging element. Thus, the parison is engaged and held in its centered position by the elements prior to being severed by the knife. The engagement of the elements with the parison flatens the parison and positions it for severing by the knife as the blow molds close to their final mold-closed positions.

Following the blow molding operation, the blow mold sections are opened, but the parison-engaging elements remain in contact with the parison exteriorly of the mold cavity and retain the parison in its centered position. Thus, the molded article is retained in its centered position so that it strips equally from the tube blow mold cavity sections as the blow mold halves are opened. Finally, opening of the blow mold halves proceeds to such an extent that the engaging elements disengage the parison and the attached blown article and the blown article is released.

As hereafter explained and when utilized in conjunction with a high speed blow molding machine having a plurality of blow molds, as for example disclosed in Criss, et al above, the severing operation performed at one mold does not release the previously blown bottle preformed in the preceding mold. This is caused by the utilization of the two spaced tube-engaging elements between which the severing knife severes the parison. The parison-engaging elements carried by the closing mold sections remote from the cavity of the closing mold sections engage the parison below the point of severence. This engagement retains the previously blown article, even after its blow mold sections have opened. This aids in stripping the blown article, since waste protions at both ends of the article are engaged during opening of the blow mold sections.

OBJECTS

It is, therefore, an important object of the present invention to provide a method of and apparatus for accurately positioning a parison at a free extrusion blow molding machine for enclosure within a closable blow mold, pinching shut the parison prior to the blow mold closure and severing the pinched portion of the parison during the blow mold closure, followed by retaining the blown article in alignment with the remainder of the extruded parison during opening of the blow mold sections.

Another important object of the present invention is the provision of the mechanism for retaining the parison of a free extrusion blow molding machine in accurate alignment with the blow mold cavity during enclosure of the parison in the blow mold and for insuring complete stripping of the blown article from the blow mold cavity during opening of the blow mold.

A further important object of this invention is the provision of a blow molding apparatus of the free extrusion type, wherein the blow mold sections carry parison-engaging elements engageable with the parison to position the parison for enclosure within the blow mold sections, to sever the parison during closure of the blow mold and to strip the blown article from the blow mold sections as the sections are opened.

It is another, and no less important, object of this invention to provide a parison positioning, severing and stripping method and apparatus for utilization in a free extrusion blow molding machine, wherein, two or more blow molds are closed in succession on an extruded parison and, wherein, the blown article is stripped from the mold cavity while being retained at both its axial extremities as the blow mold sections are opened.

ON THE DRAWINGS

AS SHOWN ON THE DRAWINGS

Figure 1:
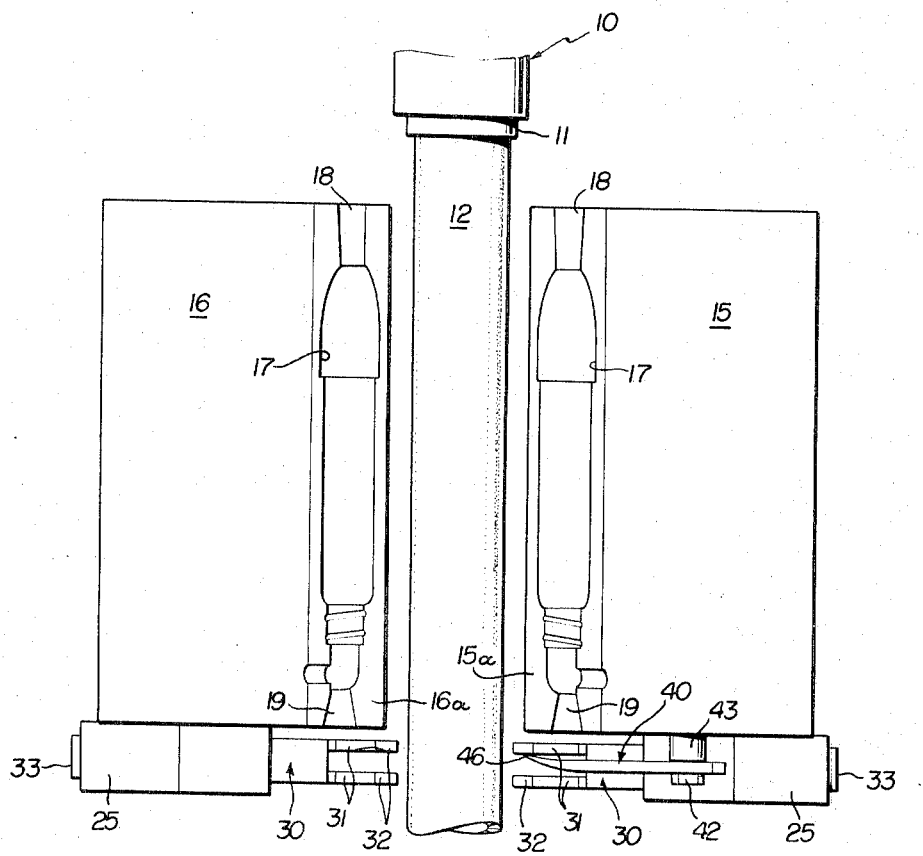
FIG. 1 is a somewhat diagramatic representation of a centering, severing and stripping mechanism of the present invention capable carrying out the method of the present invention.

FIG. 1, reference 10, refers to the outlet nozzle of a screw-type extruder or the like machine having an orifice block 11 from which a freely dependent, downwardly extruded tubular parison 12 is issued. Located beneath the orifice block 11 are blow mold sections 15, 16 having interior partial cavities 17 which cooperatively define a complete mold cavity shaped to the configuration of the article to be blown from the tubular parison 12. These blow mold cavities 17 terminate at their upper ends in tube-engaging portions 18 which engage the tube 12 and pinch it shut. Lower pinching portions 19 of the cavities 17 perform the same function at the lower end of the cavities.

The blow mold sections 15 and 16 open and close arcuately about vertical pivot centers 20 (FIG. 2) which extend vertically and which are offset laterally from the location of the parison 12. Further, the blow mold sections 15 and 16 move vertically relative to the orifice 11, the movement of the blow mold sections 15 and 16 being correlated with the speed of extrusion of the tubular parison 12 which continuously issues from the orifice block 11. The mechanism for supporting the blow molds 15 and 16 for both pivotal movement around the centers 20 and for vertical movement with the extruded parison is disclosed in detail in the above identified pending application of Criss, et al. It is not believed necessary to fully disclose all of this mechanism for supporting and displacing the blow mold sections 15 and 16 in this application.

The blow mold sections 15 and 16 each carry at their lower or leading extremities fixed support blocks 25 secured to the blow mold sections exteriorly of the cavity 17 by suitable means, as by cap screws 26. The support blocks 25 have interior arcuate guide channels 27 for guiding the parison-engaging elements, indicated generally at 30 for transverse movement relative to the guide blocks. More specifically, these elements 30 each comprise a pair of axially spaced, generally rectangular head portions 31 having angular parison-engaging surfaces 32 at their free inner ends and a single arcuate guide portion 33 projecting into and guided by the arcuate guide surfaces 27 in the blocks 25. The arcuate guide portions 33 have a central, vertically opening slot 34 extending therethrough and a compression spring 35 is positioned in each slot, the springs being in contact with the end wall 36 of each slot and with a pine 37 carried by the guide block 25 and projecting through each of the slots 34.

Figure 2:
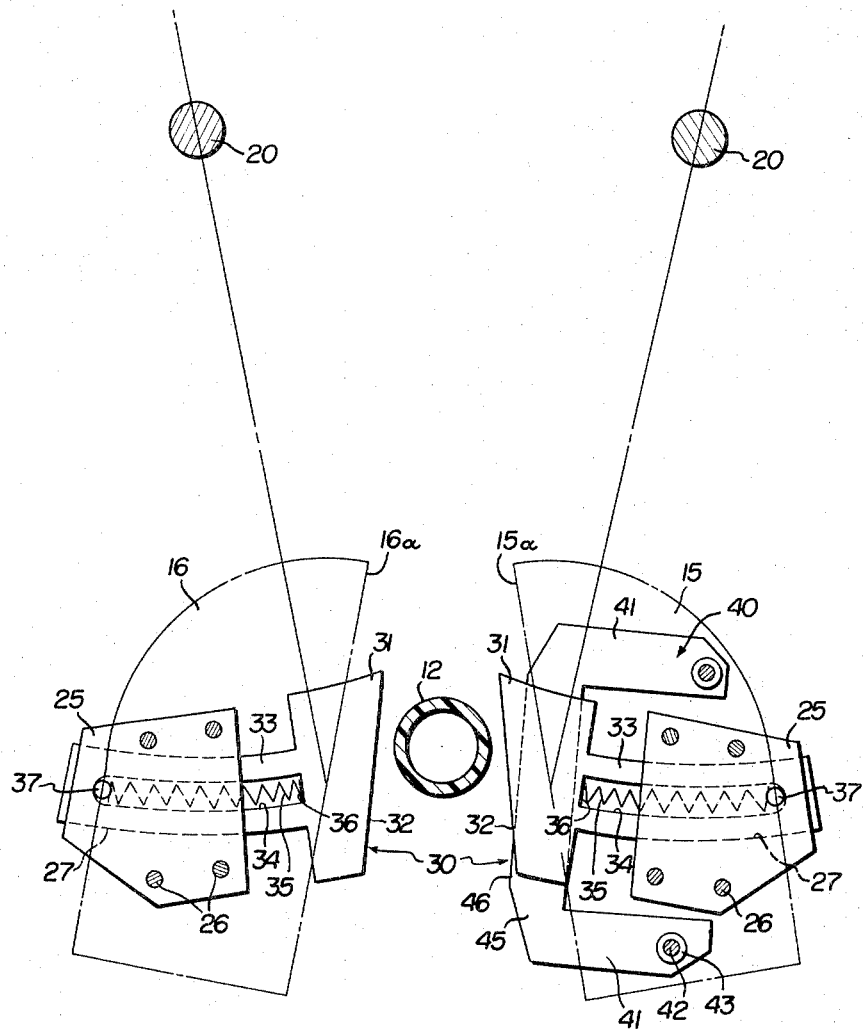
FIG. 2 is a somewhat schematic sectional view illustrating the mechanism of FIG. 1.

As illustrated in FIG. 2, the compression spring 35 reacting against the pin 37 urges the entire parison-engaging element 30 forwardly relative to its block 25 and relative to the mold half 15, 16 with which the element 30 is associated. Further, the parison-engaging surfaces 32 of the elements 30 project outwardly toward the parison 12 in advance of the abutting faces 15a, 16a of the mold sections 15, 16. Thus, as the mold sections 15, 16 are arcuately displaced around their pivot centers 20 to engage the parison 12, the surfaces 32 of the elements 30 contact the parison 12 prior to any contact between the parison and the mold sections 15, 16.

The springs 35 bias the elements 30 toward the parison 12 and in advance of the mold section faces 15a, 16a, and the springs accommodate displacement of the elements 30 relative to the mold sections 15, 16 as the mold sections close. This operation can be clearly observed by comparison of FIGS. 2 and 4.

Figure 3:
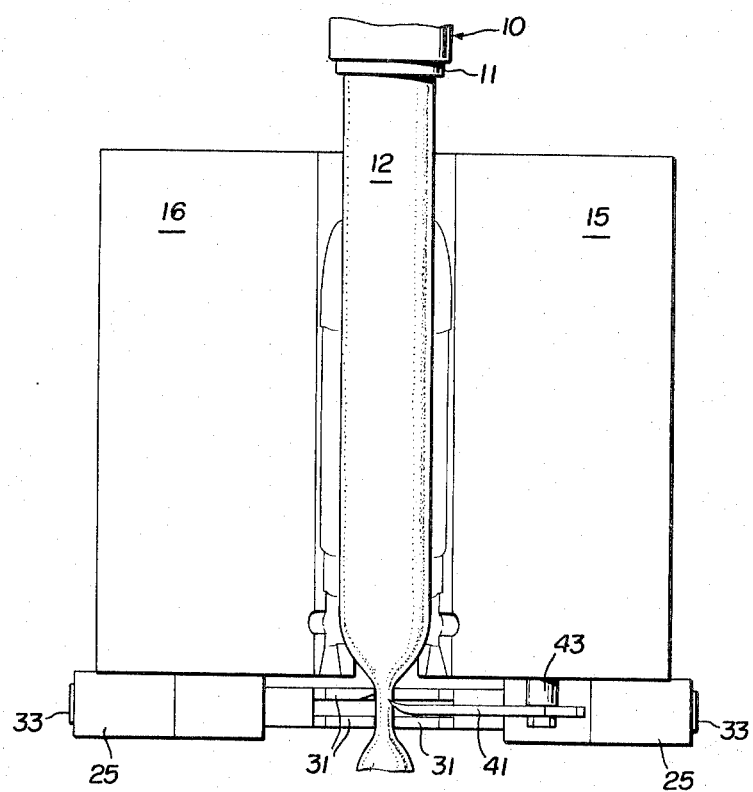
FIG. 3 is a view similar to FIG. 1 showing the blow mold sections closing upon the downwardly extruded parison of FIG. 1.

As above explained, each of the elements 30 comprises a pair of spaced heads 31, and these heads have spaced faces 32 engaging the parison, as best shown in FIG. 3 of the drawings. Interposed between the heads 31 carried by the mold section 15 is a fixed generally U-shaped knife blade 40. This knife blade 40 comprises a pair of parallel support blades 41 having their free ends secured to the mold section 15 by suitable means, as by screw 42 and spacer 43 and a blade portion 45 integral with the legs 41 and having a sharpened leading knife edge 46. The knife 40 thus is rigidly secured to the mold section 15 with the knife edge 46 being always interposed between the parison 12 and the closure face 15a of the mold section 15. When the parison-engaging elements 30 are in their furthest advanced position (FIG. 2), the parison-engaging surfaces 32 carried by the mold section 15 are in advance of the knife blade 46.

Figure 4:
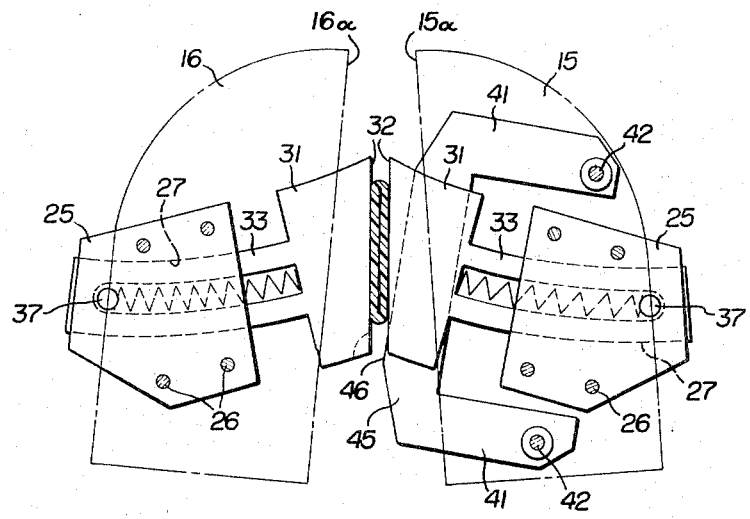
FIG. 4 is a view similar to FIG. 2, but illustrating the relative positions of the elements of FIG. 3.
Figure 5:
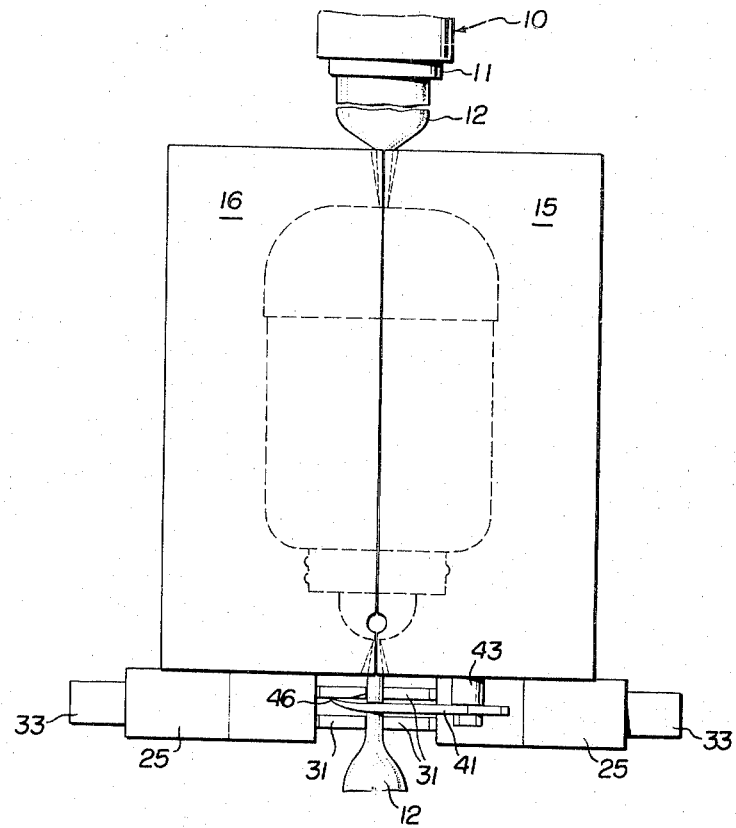
FIG. 5 is a view similar to FIGS. 1 and 3, but illustrating the blow mold sections completely closed and the article blown to its final configuration.

Thus, as may be seen in FIG. 4 of the drawings, the parison 12 is first engaged by the surfaces 32 as the mold sections 15, 16 close. The parison is generally flattened and preferably closed by its abutment with the surfaces 32 prior to engagement of the knife edge 46 with the parison. Continued closing movement of the blow molds to their finally closed positions of FIG. 6 will cause movement of the knife blade through the flattened portion of the parison, effectively severing the parison. The knife edge 46 is received between the two vertically spaced faces 32 of the heads 31 of the parison-engaging element 30 carried by the mold half 16. The interposing of the knife between the two surfaces 32 during final closure of the blow mold insures accurate and effective cutting of the parison between the abuttment surfaces 32.

The operation of the device as above described during closure of the blow mold sections 15, 16 will be readily appreciated. More specifically, the device functions to (1) engage the parison prior to any parison-mold section engagement, thereby centering the parison in accurate alignment with the mold cavity 17 defined by the mold sections 15, 16; (2) surfaces 32 pinch the parison shut prior to severing by the knife edge 46; and (3) the knife edge 46 moves through the pinched parison as the pinched parison is held rigidly between the spaced abuttment surfaces 32.

Figure 6:
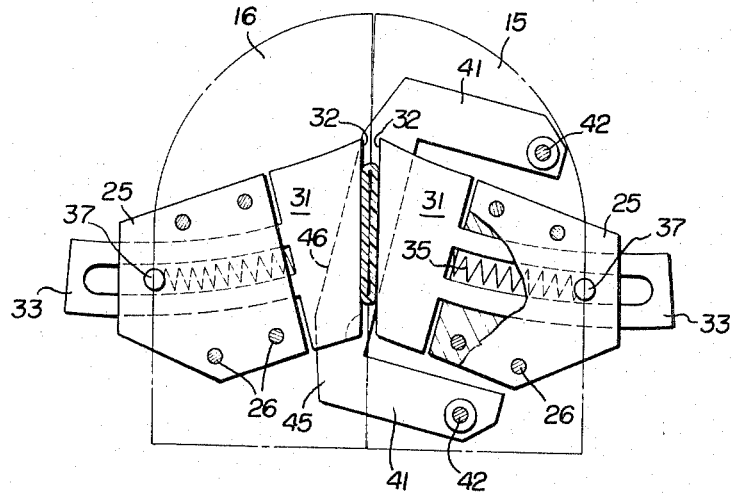
FIG. 6 is a view similar to FIGS. 2 and 4 but illustrating the relative positions of the elements of FIG. 5.

The action upon opening of the blow molds following the blowing operation is the reverse of that which has been earlier described, i.e., the relative movement of the parts proceeds from that illustrated in FIG. 6 to that illustrated in FIG. 4 to that illustrated in FIG. 2. By this opening movement, the parison-engaging surfaces 32 remain in contact with the parison as the blow mold sections 15, 16 are opened, and as the knife edge 46 is retracted from contact with the parison. This continued contact of the surfaces 32 with the parison insures that the blown article is stripped accurately from the mold cavity 17 by simply retaining the article in its vertical pendant position. Further, frictional contact of the knife with the parison as the knife is withdrawn does not deflect the blown article as to the pendant vertical position.

As above explained, this mechanism is particularly usable with the apparatus and method disclosed and claimed in the earilier Criss et al application assigned to the assignee of the present invention. In the Criss et al application, a pair of blow molds are utilized at a single extrusion orifice 11. These blow molds are closed on the tubular parison, moved downwardly with the parison during the blowing operation, opened and then returned in their opened position to the extrusion orifice 11, for the next blow molding operation. The operating cycle is such that both blow molds are closed on the parison for a short period of time. In other words, it takes less time to return the blow mold towards the orifice, than it does to move the blow mold downwardly with the parison after it has been closed.

Figure 7:
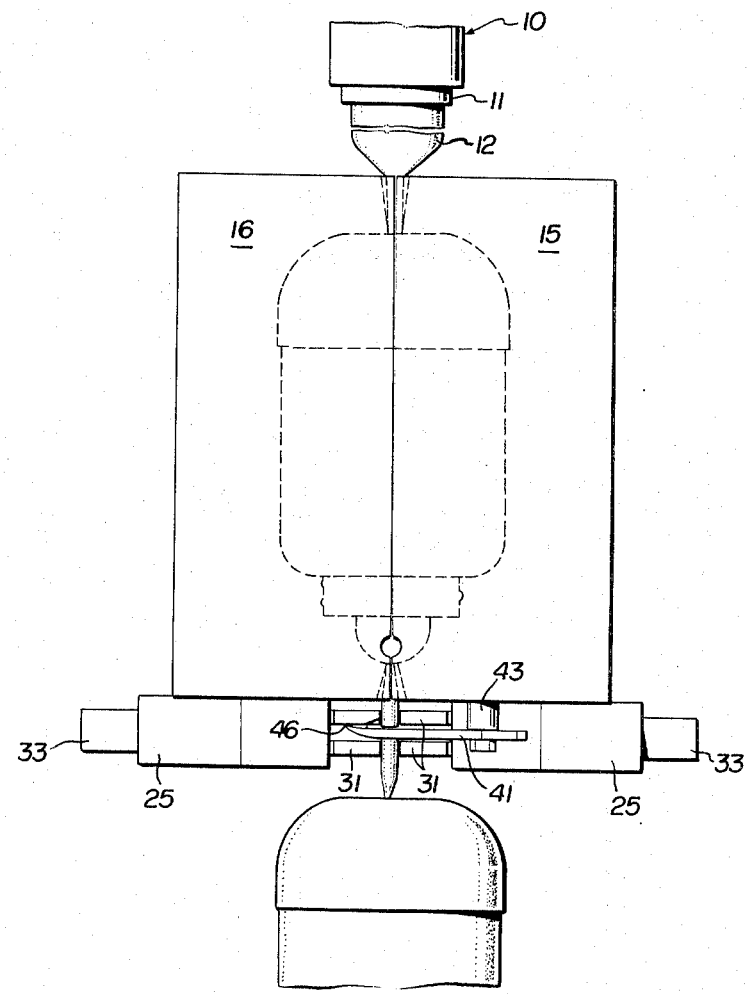
FIG. 7 is a view similar to FIG. 5 but showing the operation in connection with a subsequently blown second article.

This type of operation can be utilized to advantage in conjunction with the present mechanism. As illustrated in FIG. 7 of the drawings, the utilization of the two edges 32 on each blow mold section and the severing by the knife blade 46 between these pairs of edges 32 can result in the retention of a previously blown bottle by the lower pair of edges 32 after the mold in which this article has been formed has been opened and returned toward the extrusion orifice 11. This article simply dangles from the edges 32 in the open air for cooling by ambient air currents before being released from the edges 32 which are carried by the next successive mold.

Further, since the next successive mold closes on the parison before the mold in which the blown article is formed is opened, the parison is axially engaged both above and below the blow molds and the blow mold sections 15 and 16 at the time the blow mold sections are opened. In other words, the blow mold being opened has its parison engaged by the surfaces 32 carried by the blow mold and by the edges 32 of the next successive blow mold superimposed over the blow mold being opened. In this way, the molded article is retained by residual portions of the parison, both above and below the blown article at the time the blown article is stripped from its own blow mold. This gives a substantial advantage in insuring the accurate and complete stripping of the blown article from the blow mold while retaining the blown article in exact axial alignment with the extrusion orifice.

We claim:

1. In a blow mold for use in a free-extrusion blow molding machine wherein a tubular parison is enclosed and blown to a final shape in a mold cavity defined interiorly of said mold, the mold having a pair of mold sections actuated for opening and closing movement, the sections when closed defining the mold cavity and pinching shut axially spaced portions of said tubular parison, the improvements of an opposed pair of parison-engaging elements slidably and resiliently mounted on the respective mold sections exteriorly of said mold cavity, said elements each normally resiliently projecting beyond the confines of its respective section to initially engage and pinch the tubular parison before full closure of the mold sections upon the parison during closing movement thereof, said elements remaining in contact with the tubular parison during blowing and during a substantial part of the opening movement of the mold sections, and a parison-severing knife fixed to one of said sections, said knife also projecting beyond the confines of the one section but less than the projection of the corresponding element to engage and sever the element-pinched portion of the parison during and under the impetus of closing movement of the mold sections.

2. In a blow mold as defined in claim 1, the further improvements wherein said parison-engaging elements on each mold section each includes a pair of axially spaced parison-engaging faces, and said parison-severing knife is interposed intermediate the parison engaging faces of said elements.

3. In a blow mold as defined in claim 1, and wherein the mold sections are moved arcuately to and from their closed cavity-defining positions, the further improvements wherein said slidable parison-engaging elements move arcuately relative to said mold sections.

4. In a blow molding system having a plurality of aligned and reciprocating sets of separable blow mold halves which open and close by substantially horizontal relative movement and which are arranged beneath an extruder, and wherein the upper set is closed for blowing while the lower set is simultaneously opening following blowing, the improved mold construction comprising:

a parison-gripping element slidably and resiliently mounted on each of the mold halves at a point below the respective mold cavity, each of said gripping elements being positioned and dimensioned to normally resiliently project beyond the confines of its respective mold half and towards the mating mold half so that, during closing of the mating mold halves, the pair of opposed gripping elements of said mold pair will initially engage and pinch together the tubular parison prior to full closing of said mold pari, and said gripping faces continuing to grip the parison during a substantial part of the opening movement of the mold halves;

a parison-severing knife mounted on one mold half of each pair at a point laterally aligned with the pinched portion of the parison so that portions of the gripping elements on such mold half pair are positioned both above and below the knife to maintain gripping support of the severed tubular parison on both sides of the severing line following severing and as the mold halves open;

and knife actuating means for causing said knife to engage and sever the parison after pinching and prior to the opening of the mold halves.

* * * * *